(No Model.) 2 Sheets—Sheet 1.

C. T. BRADSHAW.
JEWELER'S SAWDUST BOX.

No. 540,205. Patented May 28, 1895.

Attest:
Edw. S. Duvall, Jr.
J. A. Saul

Inventor:
Charles T. Bradshaw
by Chandler Chandlee, Atty.

THE NORRIS PETERS CO., PHOTO-LITHO., WASHINGTON, D. C.

(No Model.) 2 Sheets—Sheet 2.

C. T. BRADSHAW.
JEWELER'S SAWDUST BOX.

No. 540,205. Patented May 28, 1895.

Attest:
Edw. S. Duvall Jr.
J. A. Saul

Inventor:
Charles T. Bradshaw
by Chandler & Chandler
Atty

UNITED STATES PATENT OFFICE.

CHARLES T. BRADSHAW, OF WASHINGTON, DISTRICT OF COLUMBIA.

JEWELER'S SAWDUST-BOX.

SPECIFICATION forming part of Letters Patent No. 540,205, dated May 28, 1895.

Application filed November 15, 1894. Serial No. 528,901. (No model.)

*To all whom it may concern:*

Be it known that I, CHARLES T. BRADSHAW, a citizen of the United States, residing at Washington, in the District of Columbia, have invented certain new and useful Improvements in Jewelers' Sawdust-Boxes; and I do hereby declare the following to be a full, clear, and exact description of the invention, such as will enable others skilled in the art to which it appertains to make and use the same.

My invention relates to what are commonly known as sawdust boxes; the object thereof being to provide a device of this nature which may be interchangeably used, and thus save much time in the drying operation.

With this object in view my invention consists of an open-ended box of any suitable material, having a cut-off arranged substantially midway of its ends, and adapted to be exteriorly operated. On each side of this cut-off is fixed a net or other form of grating to allow the passage of sawdust through the cut-off when the latter is opened, and at the same time retain the articles being treated within their proper compartment.

Figure 1:
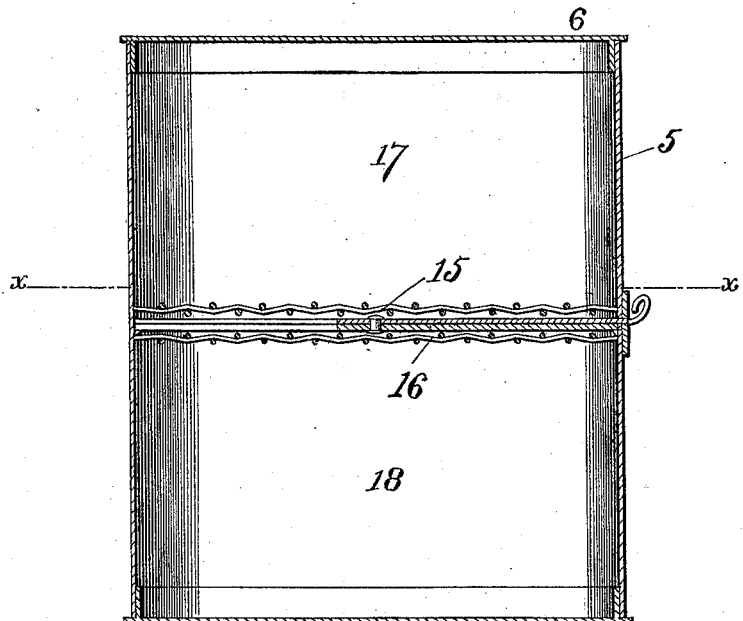
Figure 2:
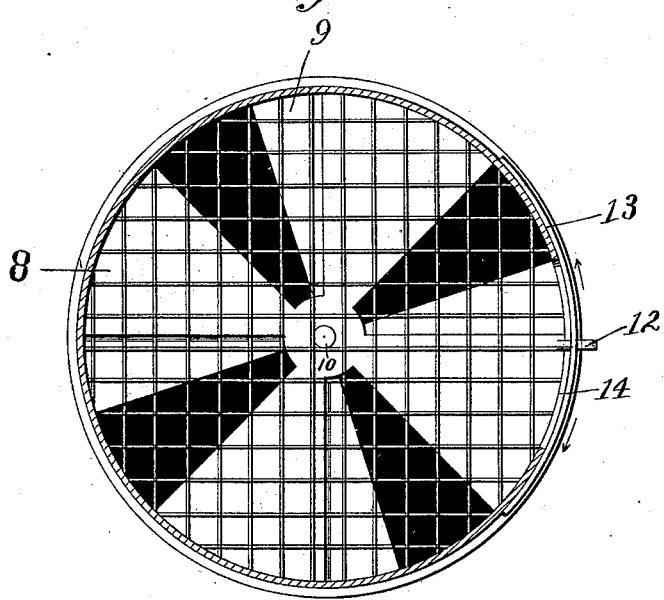
Figure 3:
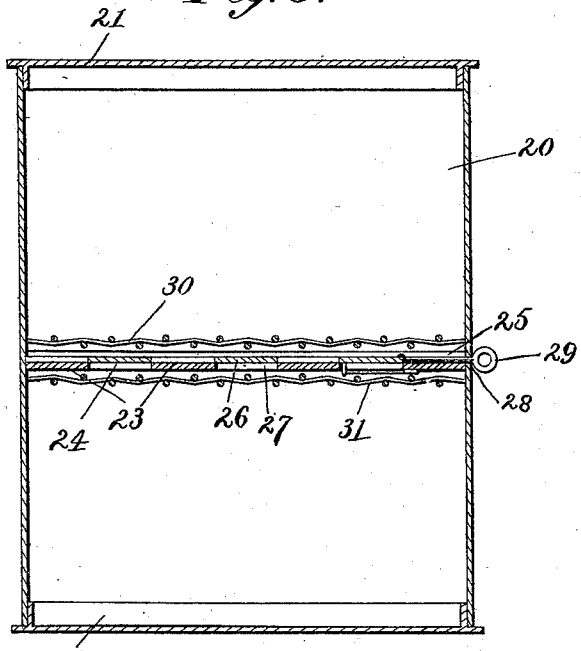
Figure 4:
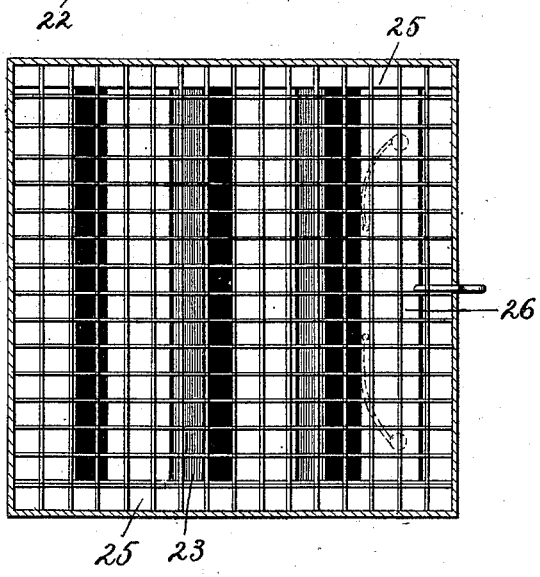
Figure 5:
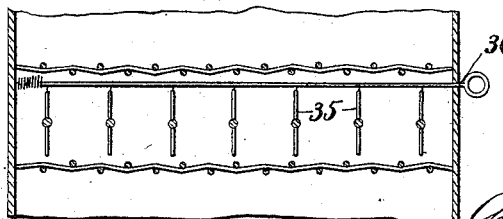

Referring now to the drawings forming a portion of this specification, and in which like symbols of reference indicate similar parts in the several views, Figure 1 is a longitudinal cross-section of my device, showing the arrangement of the cut-off and the gratings on both sides. Fig. 2 is a horizontal section on line *x x* of Fig. 1. Fig. 3 is a view similar to Fig. 1, showing a square box having a slidable cut-off. Fig. 4 is a horizontal section of Fig. 3 on line *y y;* and Fig. 5 is a longitudinal cross-section of a portion of the box, showing a cut-off formed of oscillatory slats.

In constructing a saw-dust box in accordance with my invention, as shown in Fig. 1, I employ a cylindrical box 5, which may be composed of any suitable metal, or of any other substance which may be desired, provided with removable covers 6 and 7 at each end respectively. Preferably about midway and within the box 5, is arranged a cut-off device comprising two similar elements 8 and 9, which may be formed each of a circular piece of metal having sectors removed at regular intervals. These elements are concentrically arranged in the position before stated, one of them being fixed and the other connected thereto by a central pivot 10, and having a projection 12 extending through a lateral slot 14 in the box, by means of which the said element may be oscillated as hereinafter set forth. Secured to the projection 12 is a segmental band 13 adapted to cover the slot 14 in the side of the box, through which the projection 12 is passed at all times. It will thus be seen that by reciprocating the projection 12 the element 8 will be oscillated, and will act to open or close the apertures in the element 9, hereinbefore mentioned, and thus in conjunction with the said element will form a cut-off. On each side of this cut-off, and to prevent articles of a determined size from passing therethrough, is a foraminous body in the form of a grating 15 and 16, respectively, which may be formed of wires as shown, or by punching holes in a sheet of metal, or in any other desired manner.

The operation of this form of my invention is as follows: It being desired to dry an article or several articles of jewelry or of similar nature, the cut-off is closed, and a quantity of saw-dust, bran, or other suitable absorptive material, is placed in the upper compartment 17 of the box 5, and the said articles are then inserted. The cover 6 is then put in place, cover 7 not having been removed, and the box is shaken or gyrated as is the practice with the ordinary saw-dust boxes, and until the articles therein have become thoroughly dried. The box is then held in an upright position and the cut-off is opened. The device being then gently rocked from side to side the saw-dust will pass to the lower compartment 18, when the cover may be removed, and the articles taken from the upper compartment. The cut-off is then closed, the box is reversed, and the operation may be repeated.

Referring now to Figs. 3 and 4 of the drawings, I have shown a different shape of box and form of slide in which 20, represents a square box having the usual opened ends provided with covers 21 and 22 respectively. About midway of the interior of this box as in the former instance is rigidly secured a series of slats 23 separated by interspaces 24, and having at their ends connecting strips 25, which said strips are curved or bent to lie parallel with the slats 23 and form in conjunction therewith guides to receive a second element comprising similar slats 26, having connecting strips 27 at their ends. These strips are so disposed and of such a number and size as to form covers for the interspaces 24, above-mentioned, and in conjunction with the fixed element to form a completed partition for the box. An aperture 28 allows the reciprocation of the second element, which said motion is contributed through the medium of a handle 29 attached thereto. Gratings 30 and 31 are arranged above and below this cut-off, as in the former construction, and for the same purposes. The operation of this form of my invention as will be readily appreciated is identical with that above mentioned with the exception of the operation of the cut-off.

In Fig. 5 is shown a different form of cut-off in which a series of slats 35 are pivoted within a box, and are provided with a common operating rod 36 passed through said box and provided with a suitable handle.

It will thus be seen that I have provided a saw-dust box which will remove the saw-dust from the articles treated, and thus leave them in plain sight, so that they may be readily removed, and may not become lost. Moreover, the contrivance being reversible much time and annoyance are dispensed with, and a consequent saving is effected.

If desired, I may omit the foraminous partitions separating the end chambers of the box from the cut-off and may, in the operation of the device, open said cut-off only to such an extent as to cause it to act as a sieve; or I may form the elements of the cut-off, each with a greater number of blades than shown and may open the cut-off to its greatest extent. Furthermore, I may omit the cut-off and have but a single foraminous partition, with which construction, the article to be cleaned will be first placed in the chamber containing no saw-dust. The cover will be then placed on that end of the box and the latter inverted and gently gyrated to produce the desired effect. When the operation is completed, the box will be inverted, when the saw-dust will return to the first chamber and the article will be deposited on the partition.

It will be readily understood that my invention is not limited to the drying of jewelry, as it may be employed as a rumble, and in such office be used to clean and polish such articles as it may be desired to treat, and that moreover, the particular construction of its elements, and their composition may be greatly varied without departing in anywise from the spirit of my invention.

Having now described my invention, its construction, and method of operation, what I claim is—

1. A saw-dust box, having a cut-off arranged interiorly thereof, a chamber on each side of said cut-off, and a foraminous partition separating each chamber from the cut-off.

2. A saw-dust box, comprising an open-ended receptacle having an internal, transversely arranged cut-off, a chamber on each side of said cut-off and separated therefrom by a foraminous partition, a removable cover for each end of the receptacle, and means extending without the receptacle and having connection with the cut-off for operating the latter.

3. A saw-dust box, having a cut-off located internally thereof, a foraminous body arranged on each side of the cut-off and a removable cover also at each side of the cut-off whereby the box may be interchangeably operated.

4. A saw-dust box, comprising a receptacle having an oscillatory cut-off arranged internally thereof, a chamber on each side of said cut-off and separated therefrom by means of a foraminous partition, a slot in the receptacle, an operating lever passed through said slot and into engagement with the cut-off for operating it, and a constant covering for said slot attached to the said lever.

In testimony whereof I affix my signature in presence of two witnesses.

CHARLES T. BRADSHAW.

Witnesses:
ELIZABETH S. POOLE,
GEO. H. CHANDLEE.